(12) United States Patent
Leon

(10) Patent No.: US 10,544,591 B1
(45) Date of Patent: Jan. 28, 2020

(54) PROTECTIVE AWNING HOUSING

(71) Applicant: Randy A. Leon, Phoenix, AZ (US)

(72) Inventor: Randy A. Leon, Phoenix, AZ (US)

( * ) Notice: Subject to any disclaimer, the term of this patent is extended or adjusted under 35 U.S.C. 154(b) by 0 days.

(21) Appl. No.: 16/405,550

(22) Filed: May 7, 2019

(51) Int. Cl.
*E04F 10/06* (2006.01)
*B60P 3/34* (2006.01)
*E04H 15/08* (2006.01)

(52) U.S. Cl.
CPC .......... *E04F 10/0685* (2013.01); *B60P 3/341* (2013.01); *E04H 15/08* (2013.01); *B60Y 2200/147* (2013.01)

(58) Field of Classification Search
CPC ...... E04F 10/0685; E04H 15/08; B60P 3/341; B60Y 2200/147
USPC ................... 160/22, 25, 66, 67, 85
See application file for complete search history.

(56) References Cited

U.S. PATENT DOCUMENTS

| 2,205,015 | A | * | 6/1940 | Lowry | E04F 10/0685 |
| | | | | | 16/355 |
| 3,364,973 | A | * | 1/1968 | Railson | B60P 3/343 |
| | | | | | 135/117 |
| 3,923,074 | A | * | 12/1975 | McKee | B60P 3/343 |
| | | | | | 160/22 |
| 4,188,964 | A | * | 2/1980 | Greer | B60P 3/343 |
| | | | | | 135/88.12 |
| 4,941,524 | A | * | 7/1990 | Greer | B60P 3/343 |
| | | | | | 160/67 |
| 4,997,021 | A | * | 3/1991 | Brutsaert | E04F 10/0618 |
| | | | | | 135/88.11 |
| 5,242,003 | A | * | 9/1993 | Pozzi | B60P 3/343 |
| | | | | | 160/22 |
| 5,285,837 | A | * | 2/1994 | Pozzi | B60P 3/343 |
| | | | | | 135/88.12 |
| 6,363,664 | B1 | * | 4/2002 | Brutsaert | E04F 10/0618 |
| | | | | | 135/117 |
| 9,010,347 | B2 | * | 4/2015 | Wang | B60J 11/04 |
| | | | | | 135/117 |
| 2005/0022942 | A1 | * | 2/2005 | Heitel | B60P 3/343 |
| | | | | | 160/22 |
| 2005/0072532 | A1 | * | 4/2005 | Holden | E04F 10/0685 |
| | | | | | 160/66 |
| 2007/0113879 | A1 | * | 5/2007 | Li | E04H 15/08 |
| | | | | | 135/88.07 |
| 2007/0246168 | A1 | * | 10/2007 | Ito | E04F 10/06 |
| | | | | | 160/22 |
| 2009/0025887 | A1 | * | 1/2009 | Ito | E04F 10/06 |
| | | | | | 160/25 |
| 2009/0050277 | A1 | * | 2/2009 | Ito | E04F 10/0618 |
| | | | | | 160/67 |

* cited by examiner

*Primary Examiner* — Joshua K Ihezie
(74) *Attorney, Agent, or Firm* — Thomas W. Galvani, P.C.; Thomas W. Galvani

(57) ABSTRACT

A device for protecting a furling awning mounted on a vertical surface includes a top cover having a back panel, a top panel, and opposed top end panels, as well as a bottom cover having a bottom panel, a front panel, and opposed bottom end panels. The bottom cover is arrangeable with respect to the top cover between an open condition, in which an opening is defined opposite the vertical surface, through which the awning can unfurl from the vertical surface, and a closed condition, in which the opening is closed and the top and bottom covers cooperate to define an enclosed interior.

18 Claims, 5 Drawing Sheets

PROTECTIVE AWNING HOUSING

FIELD OF THE INVENTION

The present invention relates generally to protection from the elements, and more particularly to protection of fabrics from sun and rain exposure.

BACKGROUND OF THE INVENTION

In America, approximately nine to ten million recreational vehicles ("RVs") are driven across freeways, surface streets, and dirt roads. As an attractive way to spend time with family and friends while travelling between sites, the RV transports people through all forms of terrain and types of weather.

RVs range from very simple and inexpensive to massively complicated budget-breakers. One feature common to nearly all RVs, however, is an awning. Because an RV is not just a vehicle but converts to a home or hotel when parked, the side of an RV often becomes a welcoming front porch, complete with a front door, stairs down from the door, a carpet on the ground, and shade from above. Most RVs come equipped with—or are later modified to include—an awning that the owner can unfurl and leave deployed to shade the side of their RV and the ground and people next to it. When it is time to pack the RV up and drive off, the awning can be furled back to its storage position.

Awnings, however, are made of fabric, sometimes coated with a poly or plastic material, and so are susceptible to damage from the sun and rain. Many RV owners know the telltale cracking and peeling of an old RV awning. Such awnings require replacement if the owner wishes to continue to have shade. Replacement is not always cheap, and new awnings can run several hundred if not one thousand dollars. Moreover, despite the illustrative drawings herein, this problem is not unique to RVs. Awnings are used in a wide variety of locations and installations and are affected by the same issues. A way to protect awnings from exposure to the environment is needed.

SUMMARY OF THE INVENTION

A device for protecting a furling awning mounted on a vertical surface includes a top cover having a back panel, a top panel, and opposed top end panels, as well as a bottom cover having a bottom panel, a front panel, and opposed bottom end panels. The bottom cover is arrangeable with respect to the top cover between an open condition, in which an opening is defined opposite the vertical surface, through which the awning can unfurl from the vertical surface, and a closed condition, in which the opening is closed and the top and bottom covers cooperate to define an enclosed interior.

The above provides the reader with a very brief summary of some embodiments discussed below. Simplifications and omissions are made, and the summary is not intended to limit or define in any way the scope of the invention or key aspects thereof. Rather, this brief summary merely introduces the reader to some aspects of the invention in preparation for the detailed description that follows.

BRIEF DESCRIPTION OF THE DRAWINGS

Referring to the drawings.

DETAILED DESCRIPTION

Figure 1:
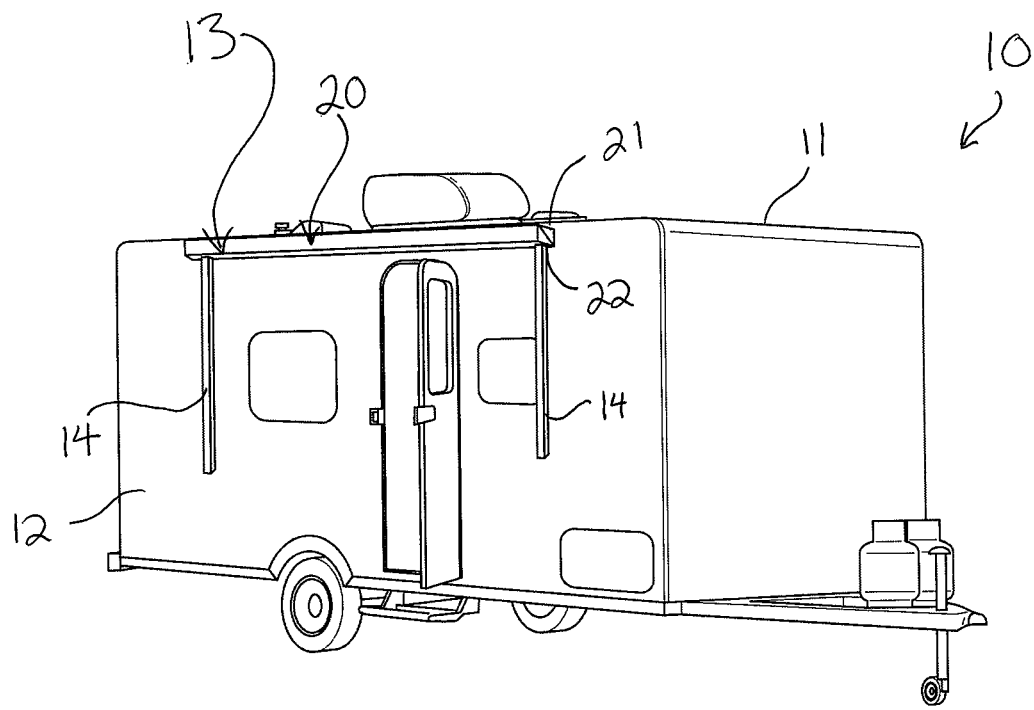
FIGS. 1 and 2 are side perspective views of a recreational vehicle with an awning in the furled and unfurled conditions, respectively, and contained within and extending from, respectively, a protective awning housing in closed and open conditions, respectively.
Figure 2:
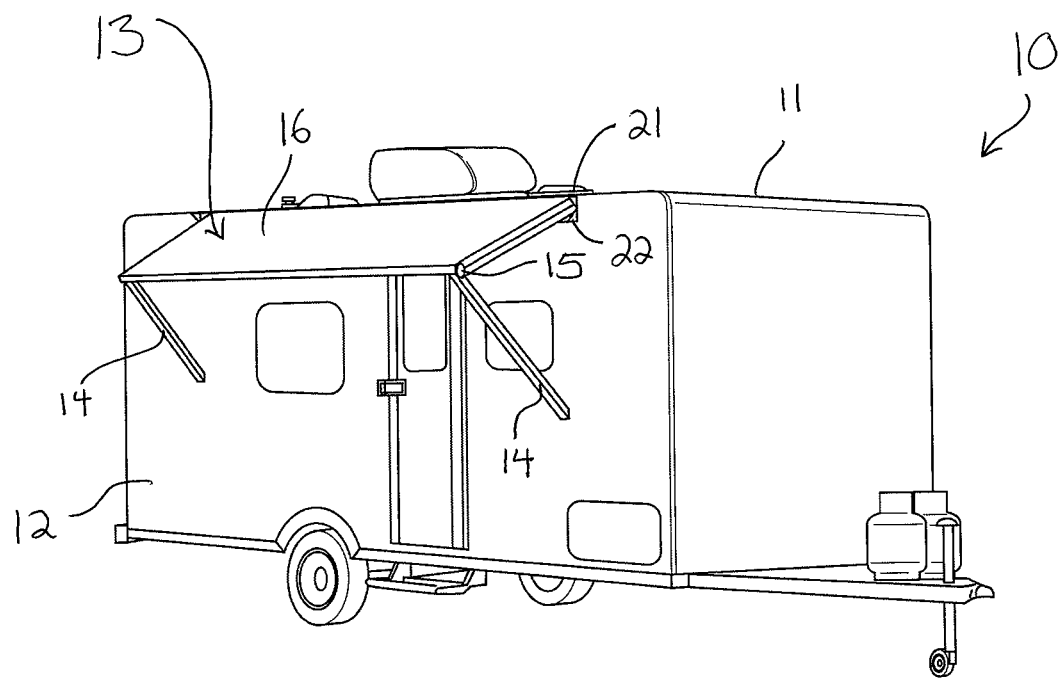

Reference now is made to the drawings, in which the same reference characters are used throughout the different figures to designate the same elements. FIGS. 1 and 2 illustrate a recreational vehicle or "RV" 10. The RV 10 has a front, a top 11, a side 12, and a door and set of windows formed into the side 12. An awning 13 is mounted to the side 12 and includes side struts 14, a roller tube 15, and a shade 16. In FIG. 1, the side struts 14 and roller tube 15 are close to the side 12 and the shade 16 is furled, rolled about the roller tube 15. In FIG. 2, the side struts 14 project out from the side 12, the roller tube 15 is maintained away from the side 12, and the shade 16 is unfurled. Such an awning 13 could be mounted to an RV 10 like the one shown in FIGS. 1 and 2, could be mounted to a Class A or B motorhome, could be mounted to the side of a house or back wall, could be mounted to many things. The description herein is made with respect to the RV 10 shown in the drawings but is not intended to be so limited. Indeed, the side 12 of the RV 10 is merely a vertical surface on which the awning 13 is mounted, and the vertical surface could be that of several other structures suitable to mount the awning 13 against. As such, the reader will appreciate that the discussion below is made with respect to the RV 10 for descriptive purposes only.

The awning 13 is protected by a protective awning housing (hereinafter, "housing" 20). The housing 20 is shown in a closed condition in FIGS. 1, 4, 5, and 6 and an open condition in FIG. 2, in which the shade 16 is unfurled through the housing 20 and away from the side 12 of the RV 10 (though the side 12 is not shown in FIG. 2). The housing 20 includes a top cover 21 and a bottom cover 22 which is mounted to the top cover 21 to move between the open and closed conditions. The top and bottom covers 21 and 22 are better shown in FIGS. 3 and 4.

Figure 3:
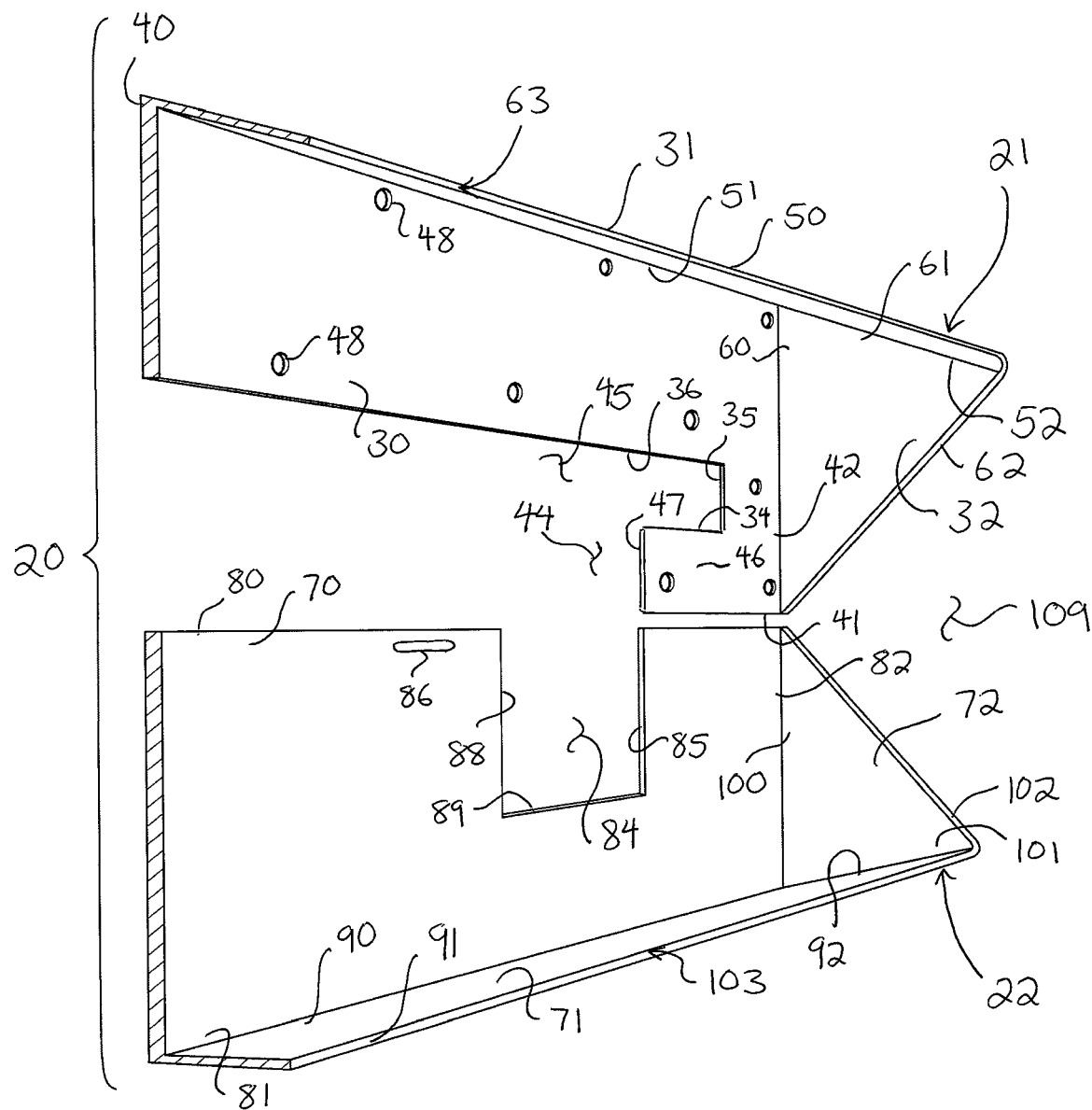
FIGS. 3 and 4 are perspective and eroded perspective section views, respectively, illustrating a top cover and a bottom cover of the protective awning housing, arranged in the open and closed conditions thereof, respectively.

FIG. 3 illustrates, in partial section view, the top and bottom covers 21 of the housing 20. The top cover 21 has a back panel 30, a top panel 31, and opposed top end panels 32 and 33 (end panel 33 is not visible in the section view of FIG. 3, but the top cover 21 has mirror symmetry and so the reader will understand that the top end panel 33 is identical but inverted with respect to the top end panel 32). The top cover 21 is quite long and thin. Indeed, both the back and top panels 30 and 31 extend entirely between the opposed top end panels 32 and 33 a distance of at least feet and perhaps as much as thirty-three feet or more. Each of the back panel 30, top panel 31, and top end panels 32 and 33 are flat, thin, and preferably integrally formed to each other.

The back panel 30 has a top 40, an opposed bottom 41, and opposed sides 42 and 43 (the side 43 is not visible in the section view of FIG. 3 but is opposite and identical to the side 42). The back panel 30 is thin, flat, and rectangular. The top is straight and continuous, extending unbroken and uninterrupted between the sides 42 and 43. The bottom 41, however, is discontinuous; a wide entrance 44 severs and interrupts the bottom 41, leading to a slot 45 disposed medially within the back panel 30. The entrance 44 is a gap located along the bottom 41. It extends upwardly from the bottom 41 approximately one-quarter of distance between the top 40 and bottom 41, and then is formed in open communication with the slot 45. The slot 45 is located just below a midline of the back panel 30 and extends downward from the midline approximately one-quarter of the distance between the top 40 and bottom 41, where it meets with and joins the entrance 44. As such, the entrance 44 and slot 45 define a single, unitary void in the back panel 30. While the entrance 44 is wide, the slot 45 is wider, and so the back panel 30 includes an L-shaped tab 46 projecting inwardly from the side 42 (and a mirror-identical one extending inwardly from the opposed side 43). The tab 46 has a length extending along the bottom 41, between the side 42 and an inward edge 47 of the tab 46, which distance is approximately equal to half the distance between the top 40 and the bottom 41, and the slot 45 extends from the tab 46 outward along a lower edge 34 by a distance approximately equal to one-quarter the distance between the top 40 and the bottom 41. The lower edge 34 is perpendicular to the inward edge 47. Then, the slot 45 is bound at its outer side by a side edge 35, which extends vertically upward from the end of the lower edge 34, by a distance approximately equal to one-quarter the distance between the top 40 and the bottom 41. The side edge 35 is perpendicular to the lower edge 34. The slot 45 is also bound by an upper edge 36, extending parallel to the top 40 from the side edge 35 toward an opposed side edge proximate the opposed side 43 of the back panel 30. The upper edge 36 is perpendicular to the side edge 35.

The top 40 of the back panel 30 is parallel to the bottom 41 and is perpendicular to the sides 42 and 43. The slot is oriented parallel to the top 40 and bottom 41, and the entrance 44 extends directly into the back panel 30 from the bottom 41 in a direction perpendicular to the bottom 41; the inward edge 47 is perpendicular to the bottom 41 and parallel to the side 42.

Figure 5:
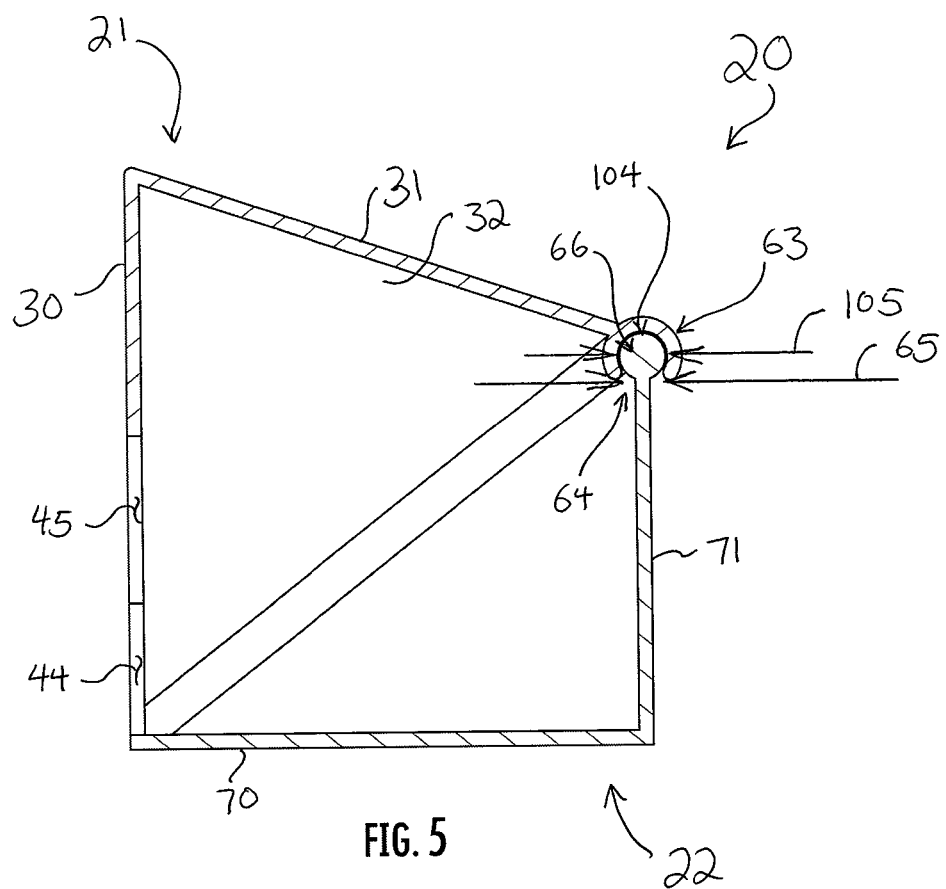
FIG. 5 is a section view of the protective awning housing taken along line 5-5 of FIG. 4.

The top panel 31 projects forwardly from the back panel 30. The top panel 31 is an integral extension of the back panel 30, formed to it along the top 40 of the back panel 30. The top panel 31 has a front 50, an opposed back 51, and opposed sides 52 and 53 (the side 53 is not visible in the section view of FIG. 3 but is opposite and identical to the side 52). The top panel 31, like the back panel 30, is thin and flat. The front 50 is straight and continuous, extending unbroken and uninterrupted between the sides 52 and 53. The back 51 is similarly straight and continuous, extending unbroken and uninterrupted between the sides 52 and 53. The front 50 and back 51 are parallel to each other and perpendicular to the sides 52 and 53, which are also straight. As such, the top panel 31 is rectangular. It is roughly coextensive to the back panel 30, and, with the back 51 of the top panel 31 formed integrally to the top 40 of the back panel 30, the back 51 and the top 40 are coextensive. The top panel 31 is oriented obliquely to the back panel 30; as best seen in FIG. 5, the top panel 31 projects at roughly sixty to seventy degrees with respect to the back panel 30.

Extending between the back panel 30 and the top panel 31, the top end panel 32 has a triangular shape. It includes a back 60, a top 61, and a front 62. The back 60 is formed along the side 42 of the back panel 30, and the top 61 is formed along the side 52 of the top panel 31. As such, both are straight, continuous, unbroken, and uninterrupted. The front 62 extends straight therebetween, and is also continuous, unbroken, and uninterrupted. The top end panel 32 is perpendicular to the back and top panels 30 and 31.

The front 50 of the top panel 31 and the fronts 62 of the top end panels 32 and 33 cooperate to define a shared continuous lower edge 63. The lower edge 63 extends from the top end panel 33 at the bottom 41 of the back panel 30, up the front of the top end panel 33, along the front 50 of the top panel 31, and down the front 62 of the top end panel 33 to terminate at the bottom 41 of the back panel 30, opposite the back panel 30 from where it began. The lower edge 63 appears in FIGS. 3 and 4 as a blunt edge. In some embodiments, it is. However, more preferably, the lower edge 63 is an elongate receiving channel or socket 66, as shown in the section view of FIG. 5. This socket 66 has a cylindrical cross-section, accessed by an entrance 64 that extends along the full length of the socket 66. The socket 66 and its entrance 64 extend radially into the lower edge 63 such that each is aligned along the length of the lower edge 63 and is oriented roughly parallel to the back panel 30. As such, the lower edge 63 opens downwardly away from the top panel 31. The entrance 64 has a dimension 65 which is smaller than the inner diameter of the cylindrical socket 66 of the lower edge 63.

Figure 4:
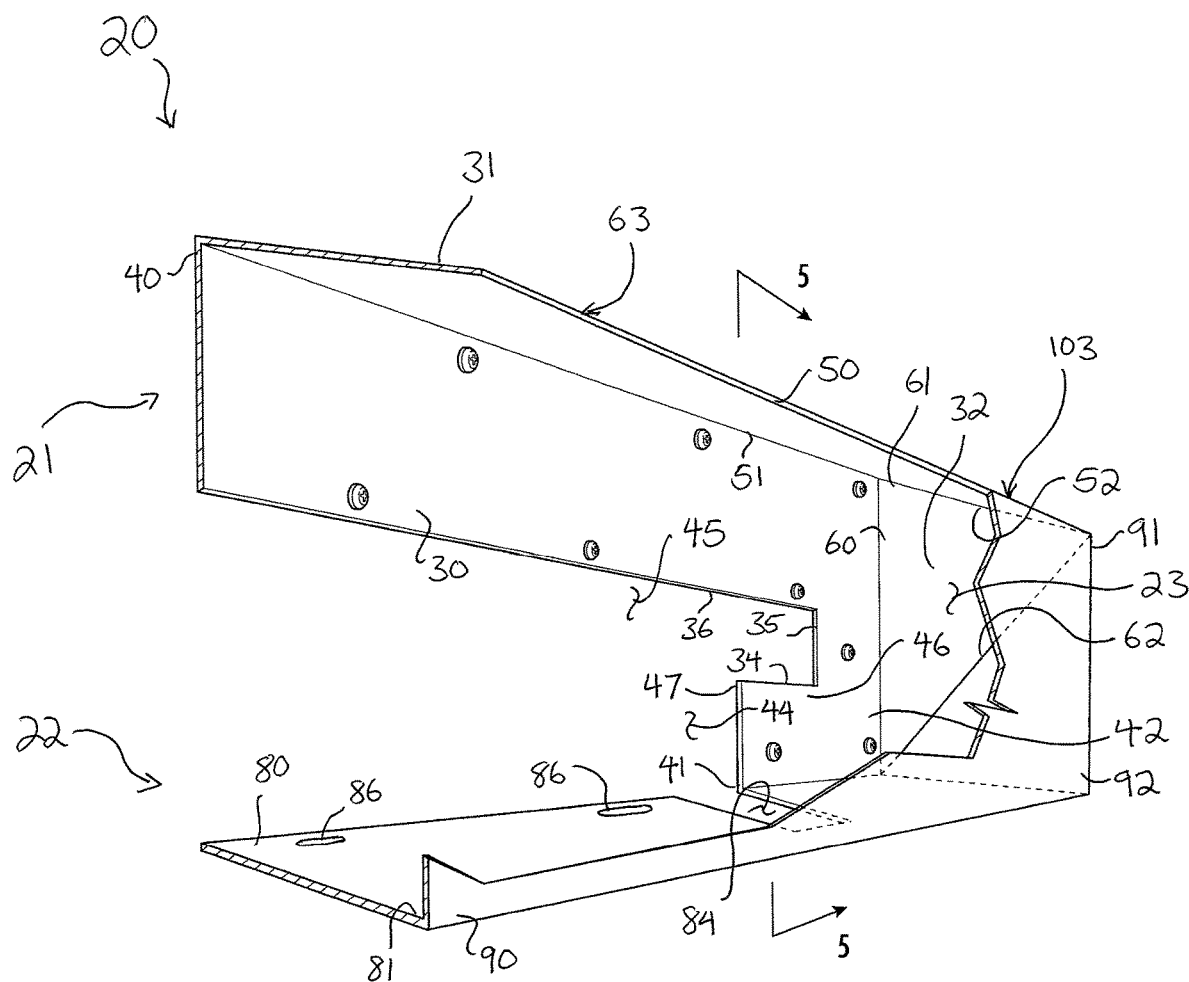

The bottom cover 22 is mounted below the top cover 21. It cooperates with the top cover 21 to define and surround an enclosed interior 23 of the housing 20, as will be described. Referring still to FIGS. 3 and 4, the bottom cover 22 has a bottom panel 70, a front panel 71, and opposed bottom end panels 72 and 73 (bottom end panel 73 is not visible in the section view of FIG. 3, but the bottom cover 22 has mirror symmetry and so the reader will understand that the end panel 73 is identical but inverted with respect to the bottom end panel 72). The bottom cover 22 is quite long and thin. Indeed, both the bottom and front panels 70 and 71 extend entirely between the opposed bottom end panels 72 and 73 a distance of at least several feet and perhaps as much as seventeen feet or more. Each of the bottom panel 70, front panel 71, and bottom end panels 72 and 73 are flat, thin, and preferably integrally formed to each other.

The bottom panel 70 has a back 80, an opposed front 81, and opposed sides 82 and 83 (the side 83 is not visible in the section view of FIG. 3). The bottom panel 70 is thin, flat, and rectangular. The back 80 is straight and continuous, extending unbroken and uninterrupted between the sides 82 and 83 but for two notches formed therein. Only a notch 84 can be seen in FIGS. 3 and 4, but there is a mirror identical and opposite notch proximate the bottom end panel 73 at the other end of the bottom cover 22. The notch 84 severs and interrupts the back 80, and extends into the bottom panel 70 approximately half the distance between the back 80 and the front 81. The notch 84 is rectangular, roughly square, and has an outward edge 85 which, when the top and bottom covers 21 and 22 are registered with each other, is registered with the inward edge 47. The notch 84 is further defined by an inward edge 88 which is opposed and parallel to the outward edge 85, and a lower edge 89 extending between and perpendicular to each of the outward and inward edges 85 and 88.

Unlike the back 80, the front 81 is straight and continuous, unbroken and uninterrupted. The sides 82 and 83 are as well. The back 80 of the bottom panel 70 is parallel to the front 81 and is perpendicular to the sides 82 and 83. The notch 84 extends directly into the bottom panel 70 from the back 80 in a direction perpendicular to the back 80; the outward edge 85 is perpendicular to the back 80 and parallel to the side 82.

The front panel 71 projects forwardly (as in FIG. 3) or upwardly (as in FIG. 4) from the bottom panel 70. The front panel 71 is an integral extension of the bottom panel 70, formed to it along the front 81 of the bottom panel 70. The front panel 71 has a bottom 90, an opposed top 91, and opposed sides 92 and 93 (the side 93 is not visible in the section view of FIG. 3, but is opposite and identical to the side 92).

The front panel 71, like the bottom panel 70, is thin and flat. Its bottom 90 is straight and continuous, extending unbroken and uninterrupted between the sides 92 and 93. The top 91 is similarly straight and continuous, extending unbroken and uninterrupted between the sides 92 and 93. The bottom 90 and top 91 are parallel to each other and perpendicular to the sides 92 and 93, which are also straight. As such, the front panel 71 is rectangular. It is roughly coextensive to the back panel 31, and, with the bottom 90 of the front panel 71 formed integrally to the front 81 of the bottom panel 70, the bottom 90 and the front 81 are coextensive. The front panel 71 is oriented transversely to the bottom panel 70; as best seen in FIG. 5, the front panel 71 projects at roughly ninety degrees with respect to the bottom panel 70.

Extending between the bottom panel 70 and the front panel 71, the bottom end panel 72 has a triangular shape. It includes a bottom 100, a front 101, and a top 102. The bottom 100 is formed along the side 82 of the bottom panel 70, and the front 101 is formed along the side 92 of the front panel 71. As such, both are straight, continuous, unbroken, and uninterrupted. The top 102 extends straight therebetween, and is also continuous, unbroken, and uninterrupted. The bottom end panel 72 is perpendicular to the bottom and front panels 70 and 71.

The top 91 of the front panel 71 and the tops 102 of the bottom end panels 72 and 73 cooperate to define a shared continuous upper edge 103. The upper edge 103 extends from the bottom end panel 73 at the back 80 of the bottom panel 70, forward to the front 101 of the bottom end panel 73, along the top 91 of the front panel 71, and down the top 102 of the bottom end panel 72 to terminate at the back 80 of the bottom panel 70, opposite the bottom panel 70 from where it began. The upper edge 103 appears in FIGS. 3 and 4 as a blunt edge. In some embodiments, it is. However, more preferably, the upper edge 103 is a small cylindrical extrusion 104, as shown in the section view of FIG. 5. This extrusion 104 has a cylindrical cross-section, and has a dimension 105 which is larger than the thickness of the front panel 71. The dimension 105 of the extrusion 104 is also just larger than the dimension 65 of the entrance 64 of the lower edge 63 on the top cover 21, such that the upper edge 103 snap fits into the lower edge 63 when the bottom cover 22 is in the closed condition thereof.

Figure 6:
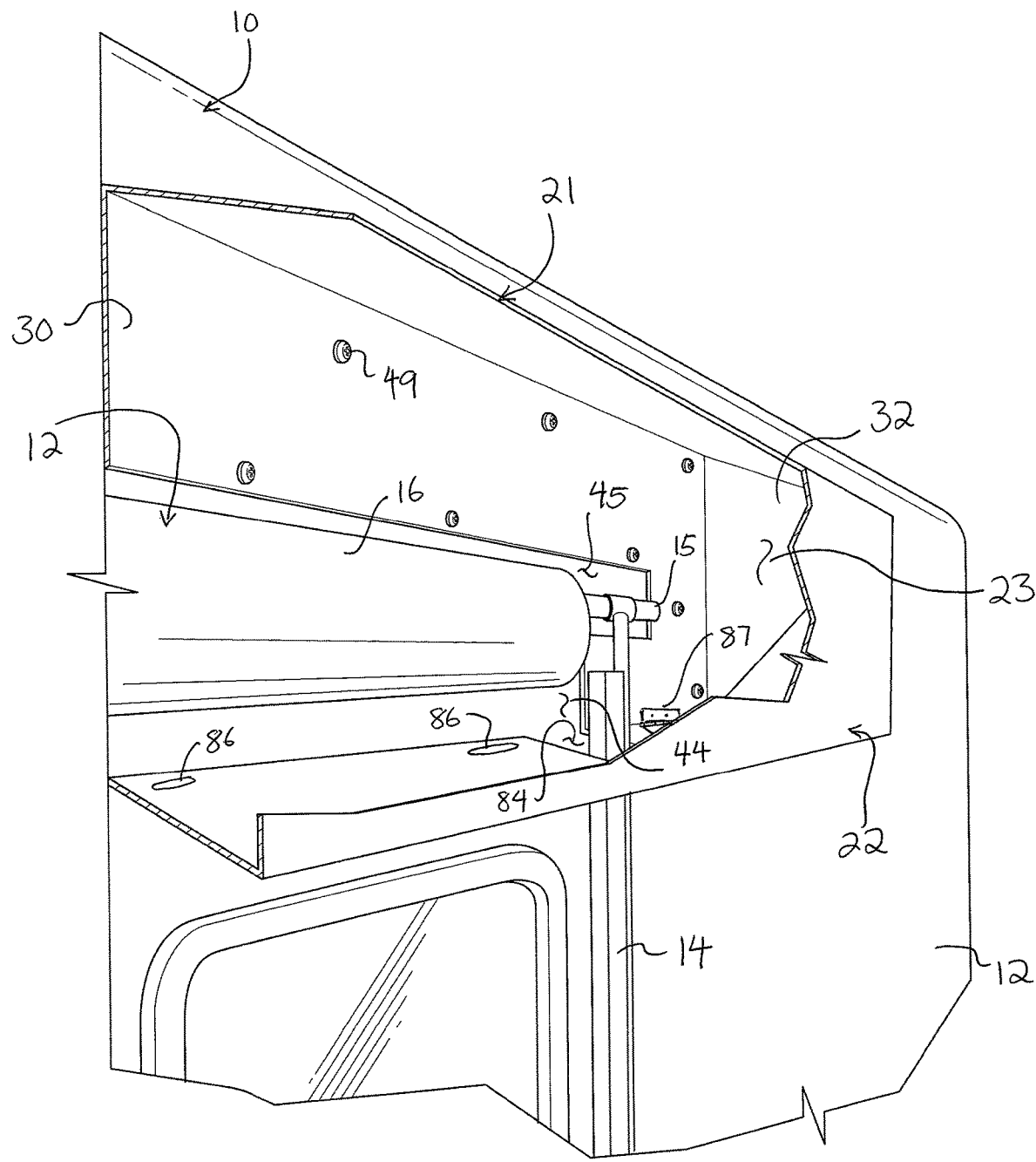
FIG. 6 is an eroded perspective view illustrating the protective awning housing in the closed condition thereof and applied to the side of a recreational vehicle.

Turning now to FIG. 6, the housing 20 is shown in a partially-sectioned, partially-eroded view, installed on the vertical surface of the side 12 of the RV 10. FIG. 6 shows the housing 20 as it would be used when the RV 10 is in storage and not moving, exposed to the sun, rain, and other elements, but protecting the awning 13 inside.

To install this housing 20 in this way, the top cover 21 is applied to the side 12 of the RV 10. First, the top cover 21 is held close to the side 12, with the slot 45 registered with the roller tube 15 and furled shade 16. The top cover 21 is then moved past the roller tube 15 and shade 16, and the back panel 30 of the top cover 21 is mounted directly to the side 12. A plurality of holes 48 (seen in FIG. 3) are formed entirely through the back panel 30, and fasteners 49 such as screws (as seen in FIG. 6) extend through the holes 48 and fasten the back panel 30 to the side 12. The fasteners 49 are considered a permanent method of mounting to the side 12, as the fasteners damage the side 12 by forming holes therein, because a tool is necessary to remove the fasteners, and because removal is relatively unlikely unless the housing 20 needs to repaired or replaced. As mentioned above, the side 12 of the RV 10 is merely a vertical surface on which the housing 20 is mounted, and the vertical surface could be that of several other structures suitable to mount the housing 20 against. As such, the reader will appreciate that this discussion is made with respect to the side 12 of the RV 10 for descriptive purposes only.

Next, the bottom cover 22 is applied to the top cover 21. The bottom cover 22 is registered with the top cover 21. This causes the notches 84 to become registered with the struts 14. When the bottom cover 22 is moved up to and against the top cover 21, the notches 84 receive the struts 14 therein, and the lower and upper edges 63 and 103 are engaged with each other. This places the housing 20 in the closed condition.

In this closed condition, the top and bottom covers 21 and 22 are closed against each other to define the interior 23 as an enclosed interior 23 in which the shade 16 of the awning 13 is contained and protected. The interior 23 extends between the opposed top and bottom end panels 32 and 33 and 72 and 73, between the bottom panel 70 of the bottom cover 22 and the top panel 31 of the top cover 21, and between the back panel 30 of the top cover 21 and the front panel 71 of the bottom cover 22. The interior 23 is roughly rectangular prismatic. The top and bottom covers 21 and 22 are fit to each other along the lower and upper edges 63 and 103. The lower and upper edges 63 and 103 are in direct and continuous contact with each other across their entire coextensive lengths. This establishes a seal between the top and bottom covers 21 and 22.

Further ensuring this seal, the extrusion 104 at the upper edge 103 is snappedly received through the entrance 64 and in the socket 66. Because the dimension 65 of the entrance 64 is just smaller than the dimension 105 of the extrusion 104, and because the inner diameter of the socket 66 corresponds to the dimension 105 of the extrusion 104, when the extrusion 104 is pushed against the entrance 64, the entrance 64 enlarges to accept the extrusion 104, which pushes past the entrance 64 and snaps into the socket 66. The entrance 64 closes slightly around the extrusion 104 once the extrusion 104 is received in the socket 66. In this way, the extrusion 104 is snappedly received in the socket 66; in other words, the upper edge 103 is snap fit into the lower edge 63 when the bottom cover 22 is in the closed condition of the housing 20. This snap fit is considered a non-permanent engagement, because the creation of the engagement does not permanently damage any structure, because no tools are necessary to remove the engagement, and because the engagement can be removed relatively easily and quickly. Moreover, because the snap fit non-permanently engages the bottom cover 22 to the top cover 21 and the top cover 21 is mounted to the side 12, the bottom cover is non-permanently mounted to the side 12. The snap-fit engagement also ensures that the seal between the top cover 21 and the bottom cover 22 is weatherproof. If water should enter the interior 23, it will drain out through drain slots 86 formed through the bottom panel 70 proximate the back 80.

When so installed, the housing 20 is mounted around the furled shade 16 and roller tube 15 proximate to the side 12 of the RV 10. The slot 45 is registered with the roller tube 15, positioned just behind it and between the roller tube 15 and the side 12. The entrance 44 to the slot is just below the roller tube 15. The unitary void of the entrance 44 and the slot 45 allows the top cover 21 to be placed over the awning 13 after an awning 13 has been installed. The struts 14 extend through the notches 84 in the bottom panel 70 of the bottom cover 22.

The bottom cover 22 is engaged to the top cover 21 in two possible manners. In one, the bottom cover 22 is snap fit to the top cover 21. In many embodiments, the bottom cover 22 is engaged to the top cover 21 only through the snap-fit engagement of the extrusion 104 received in the socket 66. This engages all four free edges of the bottom cover 22 but for the back 80, which is maintained close to the side 12. In some embodiments, however, the back 80 of the bottom cover 22 is hinged to the bottom 41 of the top cover 21, such as by a hinge 87 as shown proximate to the top end panel 32 in FIG. 6. This allows the bottom cover 22 to be pivoted with respect to the top cover 21.

The housing 20 can easily be arranged between the open and closed conditions. In the open condition, as shown in FIG. 3, an opening 109 is defined opposite the side 12 (behind the housing 20 but not shown). The awning 13 can unfurl through the opening 109 because there is no impediment to the struts 14 moving out away from the side 12, the roller tube 15 moving out from the side, or the shade 16 unfurling away from the side 12. The awning 13 can then be furled and unfurled many times without disturbance and without requiring further work. When the awning 13 is to be stored, the housing 20 is arranged into the closed condition and the opening 109 is thus closed.

When the RV 10 is to be moved or driven and the awning 13 is furled, it is preferable that the housing 20 is arranged at least in the open condition, and possibly that the housing 20 is entirely removed. If the bottom cover 22 has been snapped onto the top cover 21, the owner grabs the bottom cover 22 and gently pulls the extrusion 104 out of the socket 66 along the entire length of the lower and upper edges 63 and 103, thereby freeing the bottom cover 22 from the top cover 21. This arranges the housing 20 into the open condition. The bottom cover 22 can then be stored at home, in storage, or inside the RV 10 until it is needed again. This prevents the bottom cover 22 from coming loose during driving and becoming a dangerous missile. If, on the other hand, the bottom cover 22 is hinged to the top cover 21 and has also been snapped onto the top cover 21, then then owner may prefer to leave the bottom cover 22 so attached. In some embodiments, a buckle may be mounted across the lower and upper edges 63 and 103 and latch the top and bottom covers to each other, such that the lower and upper edges 63 and 103 do not come loose. In some instances, it may be preferable to completely the remove entire housing 20. When this is necessary, the fasteners are threaded out of the side 12 and the top cover 21 is pulled off the side 12 of the RV 10. The RV 10 may then be driven to a location and the housing 20 re-mounted.

A preferred embodiment is fully and clearly described above so as to enable one having skill in the art to understand, make, and use the same. Those skilled in the art will recognize that modifications may be made to the description above without departing from the spirit of the invention, and that some embodiments include only those elements and features described, or a subset thereof. To the extent that modifications do not depart from the spirit of the invention, they are intended to be included within the scope thereof.

The invention claimed is:

1. A device for protecting a furling awning mounted on a vertical surface, the device comprising:
 a top cover including a back panel, a top panel, and opposed top end panels, wherein the back panel has a continuous top and a broken bottom interrupted by a wide entrance to a slot, the slot being disposed medially on the back panel; and
 a bottom cover including a bottom panel, a front panel, and opposed bottom end panels;
 wherein the bottom cover is arrangeable with respect to the top cover between an open condition, in which an opening is defined opposite the vertical surface, through which the awning can unfurl from the vertical surface, and a closed condition, in which the opening is closed and the top and bottom covers cooperate to define an enclosed interior.

2. The device of claim 1, wherein:
 the top panel and top end panels share a continuous lower edge;
 the front panel and bottom end panels share a continuous upper edge; and
 when the bottom cover is in the closed condition, the lower and upper edges are in direct and continuous contact with each other.

3. The device of claim 1, further comprising:
 a lower edge which is an elongate socket having an entrance with a first dimension; and
 an upper edge which is a cylindrical extrusion having a second dimension just larger than the first dimension, such that the upper edge snap fits into the lower edge when the bottom cover is in the closed condition thereof.

4. The device of claim 1, wherein the bottom cover is hinged to the top cover.

5. The device of claim 1, wherein the bottom cover is formed with drain slots in the bottom panel.

6. The device of claim 1, wherein the top panel is oriented obliquely with respect to the back panel, and the front panel is oriented transverse with respect to the bottom panel.

7. The device of claim 1, wherein the top cover is permanently mounted to the vertical surface and the bottom cover is non-permanently mounted to the vertical surface.

8. A device for protecting a furling awning mounted on a vertical surface, the device comprising:
 a top cover including a back panel, a top panel, and opposed top end panels, wherein the top panel and top end panels share a continuous lower edge; and
 a bottom cover including a bottom panel, a front panel, and opposed bottom end panels, wherein the front panel and bottom end panels share a continuous upper edge;
 wherein the bottom cover is arrangeable with respect to the top cover between an open condition, in which an opening is defined opposite the vertical surface, through which the awning can unfurl from the vertical surface, and a closed condition, in which the lower and upper edges are in sealed contact with each other, the opening is closed, and the top and bottom covers cooperate to define an enclosed interior.

9. The device of claim 8, wherein:
 the lower edge is an elongate socket having an entrance with a first dimension; and
 the upper edge is a cylindrical extrusion having a second dimension just larger than the first dimension, such that the upper edge snap fits into the lower edge when the bottom cover is in the closed condition thereof.

10. The device of claim 8, wherein:
 the bottom cover is hinged to the top cover; and
 the bottom cover is formed with drain slots in the bottom panel.

11. The device of claim 8, wherein the top panel is oriented obliquely with respect to the back panel, and the front panel is oriented transverse with respect to the bottom panel.

12. The device of claim 8, wherein the back panel has a continuous top and a broken bottom interrupted by a wide entrance to a slot, the slot disposed medially on the back panel.

13. The device of claim 8, wherein the top cover is permanently mounted to the vertical surface and the bottom cover is non-permanently mounted to the vertical surface.

14. A device for protecting a furling awning mounted on a vertical surface, the device comprising:
- a top cover including a back panel, a top panel, and opposed top end panels, wherein the top cover is permanently mounted to the vertical surface, and the back panel has a continuous top and a broken bottom interrupted by a wide entrance to a slot, the slot disposed medially on the back panel; and
- a bottom cover including a bottom panel, a front panel, and opposed bottom end panels, wherein the bottom cover is non-permanently mounted to the vertical surface;
- wherein the bottom cover is arrangeable with respect to the top cover between an open condition, in which an opening is defined opposite the vertical surface, through which the awning can unfurl from the vertical surface, and a closed condition, in which the opening is closed, and the top and bottom covers cooperate to define an enclosed interior.

15. The device of claim 14, wherein:
- the top panel and top end panels share a continuous lower edge;
- the front panel and bottom end panels share a continuous upper edge; and
- when the bottom cover is in the closed condition, the lower and upper edges are in direct and continuous contact with each other.

16. The device of claim 14, wherein:
- the lower edge is an elongate socket having an entrance with a first dimension; and
- the upper edge is a cylindrical extrusion having a second dimension just larger than the first dimension, such that the upper edge snap fits into the lower edge when the bottom cover is in the closed condition thereof.

17. The device of claim 14, wherein:
- the bottom cover is hinged to the top cover; and
- the bottom cover is formed with drain slots in the bottom panel.

18. The device of claim 14, wherein the top panel is oriented obliquely with respect to the back panel, and the front panel is oriented transverse with respect to the bottom panel.

* * * * *